UNITED STATES PATENT OFFICE.

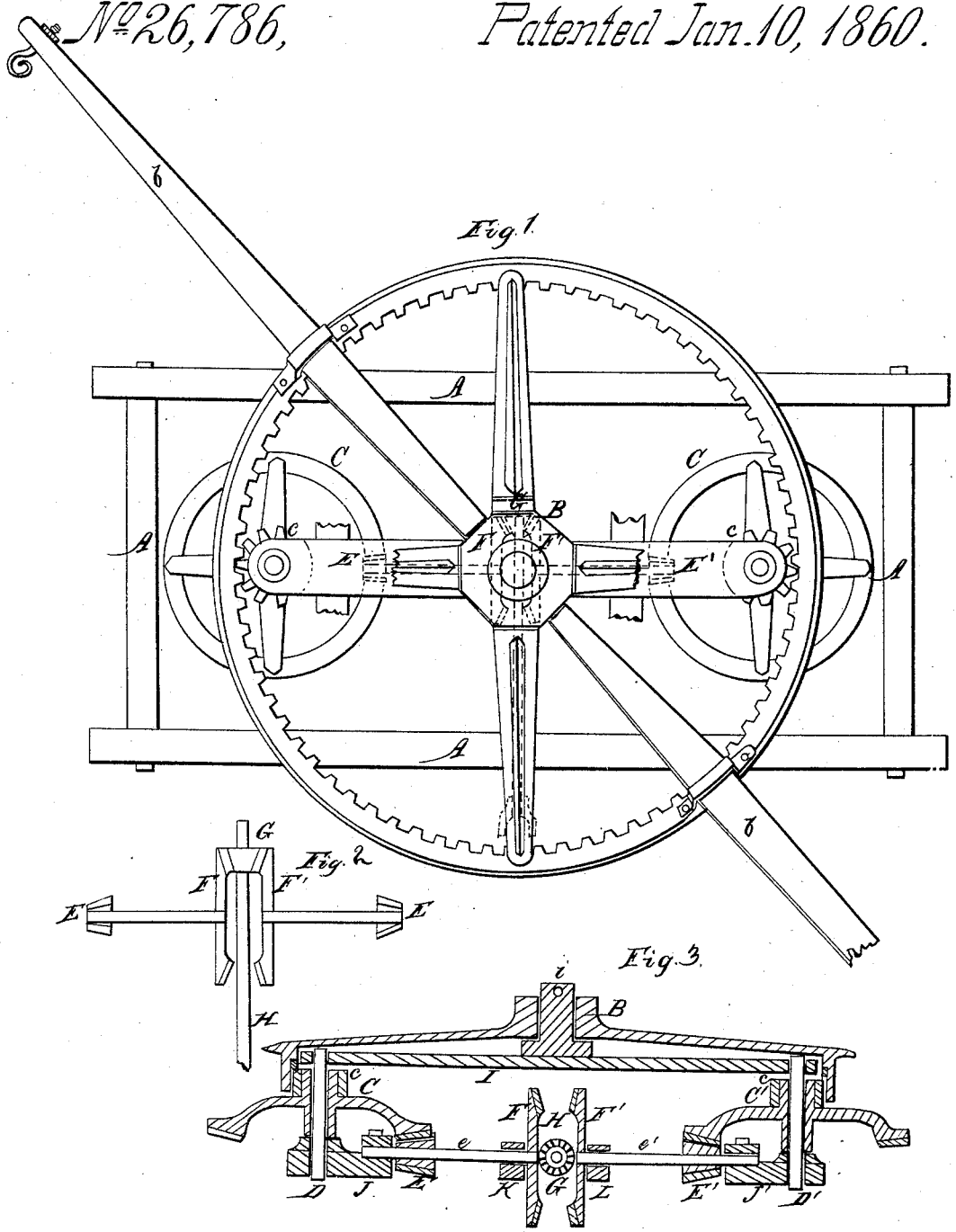

F. W. ROBINSON, OF RICHMOND, INDIANA.

HORSE-POWER.

Specification of Letters Patent No. 26,786, dated January 10, 1860.

*To all whom it may concern:*

Be it known that I, F. W. ROBINSON, of Richmond, in the county of Wayne and State of Indiana, have invented certain new and useful Improvements in Horse-Powers; and I do hereby declare that the following is a full, clear, and exact description thereof, reference being had to the accompanying drawings, making a part of this specification, and to the letters of reference marked thereon.

This improvement relates to that class of powers known as antifriction horse powers, and its consists in the contrivances herein shown by means of which a higher speed than usual is obtained within the horse power; and advantage is taken of the antifriction principle in gaining that speed, by balancing the wheels F, F' upon the pinion, G, as hereinafter set forth, whereby much friction and consequent wear and tear are obviated, and the machinery rendered more efficient with the same expenditure of power.

Figure 1st, is a top view of my improvement. Fig. 2nd, shows the relation of the wheels, F, F', and pinion, G. Fig. 3rd, is a longitudinal vertical section.

A, A, A, A, constitute the external frame of the power.

B, is the master wheel with inside cog gear.

$b, b$, are two levers of any usual form.

C, C', are two bevel wheels connected firmly with pinions, $c, c$, from which they receive motion.

$c, c$, are two pinions gearing into the master wheel B, and receiving motion therefrom.

D, is a shaft turning freely in stay I, and cross bar, J. Wheel and pinion C, $c$, also turn freely upon it, so that if it should bind in its boxings by means of side draft upon the frame of the power, there may be no needless friction. D', is a shaft similar to shaft D, being also loose in stay I, cross bar J', and wheel and pinion C', $c'$.

E, is a pinion on the out end of shaft, $e$, in contact with wheel, C, and receiving motion from it. E' is also a pinion similar to E, upon shaft $e'$. $e$, is a shaft having boxings in cross bars J, K. It has upon it pinion E, and bevel wheel F. $e'$, is a shaft similar to $e$, having upon it pinion E', and bevel wheel F', and boxing in bars J', L.

F, F', are two bevel wheels upon the approximate ends of shafts, $e, e'$. They both gear with pinion, G.

G, is a pinion upon the shaft H, receiving motion from bevel wheels, F, F', upon its opposite sides; by this means the pressure is balanced and a great portion of the wear and friction upon pinion, G, is obviated.

H, is a shaft having one of its boxings in the side of the frame, and the other extending from bar, K, to bar, L. It receives upon its inner end the pinion, G, and upon its outer end a coupling to connect with a tumbling shaft.

I, is a stay to the upper ends of shafts D, D'. It also furnishes a guide, $i$, to master wheel, B.

J, is a cross bar firmly secured to the sides of the frame. It receives the lower ends of shaft, D, and the out end of shaft, $e$. J', is also a cross bar similar to bar, J, receiving the ends of shafts D', $e'$, similarly. K, is also a cross bar near the middle of the frame furnishing support to the in end of the shaft, $e$.

L, is a cross bar similar to K, furnishing support to the in end of shaft $e'$.

Power being applied to the levers $(b)$ rotary motion is communicated to the main shaft H, and from it transferred to such other mechanism as may be desired.

Having thus described my invention what I claim and desire to secure by Letters Patent, is—

The peculiar arrangement of the pinions $(c)$ bevel gears C, C', shafts D, D', master wheel B, pinions E E', shafts $e, e'$, gears F, F', pinion G, shaft H, cross bars J, J', K, L, as and for the purpose herein shown and described.

F. W. ROBINSON.

Attest:
JOHN FINLEY,
GEO. TAYLOR.